Patented Dec. 11, 1945

2,390,899

UNITED STATES PATENT OFFICE 2,390,899

GAS PROCESSING

Robert M. Reed, Louisville, Ky., assignor to The Girdler Corporation, Louisville, Ky., a corporation of Delaware No Drawing. Application August 11, 1943, Serial No. 498,265

7 Claims. (Cl. 23—2)

This invention relates to an improvement in the processing of gases. A widely used process for the treatment of gases employs aqueous solutions of organic bases (amines) for separating acidic constituents, such as hydrogen sulphide and carbon dioxide, from other gases. In operating this process, the gases are contacted with aqueous amine solutions in a suitable contacting device, such as a bubble plate or packed absorption tower, the aqueous amine solutions are then separated from the gases, and the hydrogen sulphide and carbon dioxide are driven out of the solutions by heating, after which the solutions are cooled and contacted with further quantities of gases to separate acidic constituents therefrom.

In the operation of this process, operating difficulties are encountered at times because of foaming of the amine solutions. Foaming markedly reduces the capacity of the gas treating equipment, and renders the separation of the gas and liquid difficult. Foaming may be promoted in various ways, such as by the presence of traces of organic acids in the gases, which form salts with the organic bases that have soap-like properties, or by the presence of finely divided suspended solids such as iron sulphide in the solutions which promote and stabilize foams. Regardless of the cause of the foaming, the presence of foam in the amine solutions markedly decreases the efficiency of the solutions for separating acidic constituents from gases.

I have now found a means for eliminating foaming in aqueous amine solutions used in gas treating operations, which makes possible the utilization of gas absorption equipment at full efficiency with such solutions. The foaming of amine solutions may be eliminated by the addition of small quantities of oleyl alcohol,

$C_8H_{17}CH:CH(CH_2)_7CH_2OH$ to the aqeous amine solutions.

Oleyl alcohol is a primary olefinic alcohol which may be obtained from sperm oil or prepared by the reduction of oleic acid or its compounds. It is substantially insoluble in aqueous amine solutions, but when added to such solutions in small quantities it is extremely effective in preventing foaming in the aqueous amine solutions when they are contacted with gases.

The following example will illustrate the effectiveness of oleyl alcohol in preventing foaming in an aqueous amine solution used for separating acidic constituents from gases:

In a plant employing an aqueous solution of monoethanolamine for separating hydrogen sulphide and carbon dioxide from natural gas, the contacting of gas and liquid was carried out in a bubble plate tower. Due to foaming in the solution, the capacity of the tower was limited to 14 million cubic feet of gas per day, at which gas rate the solution would begin to pile up on the bubble plates and carry over in the outlet gas stream. After the addition of about 15 parts per million of oleyl alcohol to the amine solution it was found that the gas rate to the bubble plate tower could be increased to 50 million cubic feet per day with no carry over of solution occurring. Samples of solution taken before the addition of oleyl alcohol foamed on being shaken, with the foam persisting for one minute or more. After the addition of oleyl alcohol to the solution, the solution would not foam appreciably on being shaken. In order to maintain the solution in a non-foaming condition, it was found necessary to add 10 to 15 parts per million of oleyl alcohol to the solution daily to replace the quantity vaporized into the gas stream.

Oleyl alcohol can be added to the aqueous amine solution either continuously or at intervals so as to maintain the solution saturated with oleyl alcohol.

Having thus described my invention, what I claim as new and desire to secure by Letters Patent is:

1. In the process of scrubbing acidic gases from gaseous mixtures by the action of an aqueous solution containing organic bases, the improvement which consists in preventing foaming of the solution by adding oleyl alcohol to the solution.

2. In the process of scrubbing acidic gases from gaseous mixtures by the action of an aqueous solution of amines, the improvement which consists in preventing foaming of the solution by maintaining sufficient olelyl alcohol present in the solution to saturate it with oleyl alcohol.

3. In the process of scrubbing acidic gases from gaseous mixtures by the action of an aqueous solution of amines in a bubble plate tower, the improvement which consists in preventing foaming of the solution by adding oleyl alcohol to the amine solution.

4. In the process of scrubbing acidic gases from gaseous mixtures by the action of an aqueous solution of amines in a tower packed with Raschig rings, the improvement which consists in preventing foaming of the solution by adding oleyl alcohol to the amine solution.

5. In the process of scrubbing acid gases from gaseous mixtures by the action of an aqueous solution of monoethanolamine, the improvement which consists in preventing foaming of the solution by adding oleyl alcohol to the solution.

6. In the process of scrubbing acidic gases from gaseous mixtures by the action of an aqueous solution of monoethanolamine in a bubble plate tower, the improvement which consists in preventing foaming of the solution by adding oleyl alcohol to the solution.

7. In the process of scrubbing acidic gases from gaseous mixtures by the action of an aqueous solution of diethanolamine, the improvement which consists in preventing foaming of the solution by adding oleyl alcohol to the solution.

ROBERT M. REED.